June 28, 1949.  L. PERHACS  2,474,789
VARIABLE SPEED DRIVE
Filed June 1, 1945
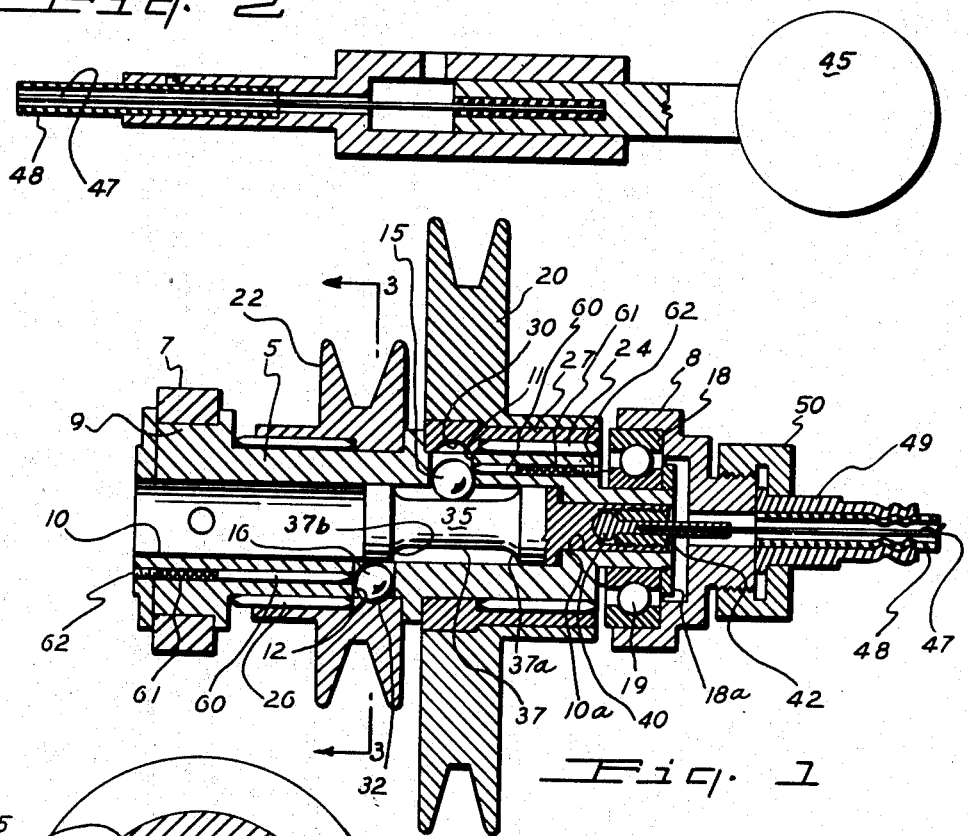
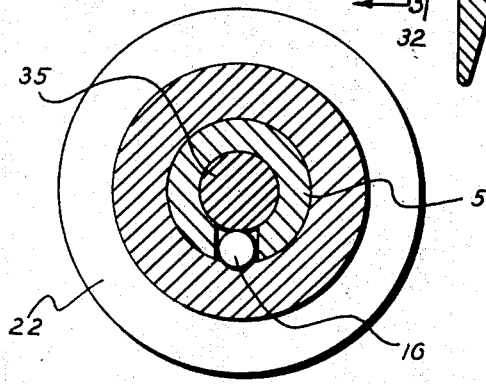
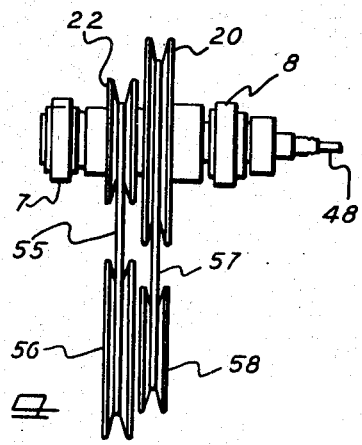
INVENTOR.
Leslie Perhacs
BY Mason Graham
Attys Patented June 28, 1949

2,474,789

UNITED STATES PATENT OFFICE 2,474,789

VARIABLE-SPEED DRIVE

Leslie Perhacs, North Hollywood, Calif.

Application June 1, 1945, Serial No. 597,071

1 Claim. (Cl. 192—48)

This invention has to do with variable speed drive devices, having as an object the provision of a simple, efficient and highly economical device of this character.

More specifically, it is an object of my invention to provide a device by which the driving speed may be easily and quickly changed by means of movement of a core or mandrel in the hollow drive shaft, upon which shaft pulleys are rotatively mounted.

Another object is the provision of a variable speed device which performs its speed changing functions without utilizing any gears or elements subject to being stripped by stresses resulting from abrupt speed changes.

An additional object is the provision of a device of this character wherein the stresses upon the cooperating parts due to speed changes are reduced to a minimum.

I shall describe one preferred embodiment, from which explanation various other objects and advantages will become apparent, although I wish it understood that the invention, in its broader aspects, is not intended to be restricted to the particular embodiment and details shown in the accompanying drawings and now to be described.

In the accompanying drawings forming a part of this invention:

Fig. 1 is a medial longitudinal section;

Fig. 2 is a sectional view forming a continuation of Fig. 1;

Fig. 3 is a section on line 3—3 of Fig. 1; and

Fig. 4 is a reduced top plan view of a device embodying my invention.

Referring now to the embodiment of the invention shown in the drawings, the numeral 5 denotes a driven shaft journalled in bearings 7, 8, and having annular flange 9, an axial bore 10 having a reduced diameter portion 10a, and having radial openings 11, 12 within which the respective balls 15, 16 loosely fit. The shaft 5 is adapted to be connected to a motor, not shown.

Between the reduced diameter right-hand end portion of the shaft and bearing 8 are mounted bearing races 18, carrying ball bearings 19. The inner race is secured by a nut 18a.

Pulleys 20, 22, having V-shaped belt grooves, are rotatably mounted on the shaft 5, being provided with needle bearings 24, 26, pulley 20 having a relatively hardened bushing 27 presenting in its bore a concaved or spherical recess 30 conforming to the surface of the ball 15. Pulley 22 is not shown as being provided with a similar bushing, since it is not subject to as great stresses as the larger pulley, but there is provided in the bore of pulley 22 a concaved recess 32 conforming to the surface of ball 16. Of course, if desired, a hardened bushing similar to that of bushing 27 may be utilized in pulley 22.

It will be apparent from the foregoing description that either of the pulleys 20, 22 may be locked to the shaft 5 by means of the ball 15 or 16 being cammed or forced outwardly in the opening 11 or 12 and into the recess 30 or 32. To accomplish this, I provide a mandrel or core 35 which is axially slidable in the bore of the shaft 5 and has an annular groove 37 curved at its opposite ends to provide cam surfaces 37a, 37b.

A plunger having a ball-shaped end portion 40 is rotatably connected into the recessed shank end of the mandrel by means of a threaded plug 42 through which the stem of plunger 40 slidably extends, the latter being operatively connected to a manually operable push and pull knob 45 by means of a flexible wire or cable 47 slidably disposed in a sheathing 48, the latter carrying a ferrule 49 secured to the reduced diameter threaded outer end of the bearing 8 by collar 50.

It will be observed that by sliding the mandrel 35 to the right (into the position shown in the drawings) ball 15 is permitted to move out of the recess 30 in the pulley 20 and thus free that pulley to rotate relative to shaft 5, while the cam surface 37b will move ball 16 into engagement in the recess 32 and consequently fix pulley 22 to the shaft. Pulley 22 is operatively connected by a V-belt 55 to a larger diameter pulley 56 while pulley 20 is operatively connected by belt 57 to a smaller diameter pulley 58.

To restrain the balls 15, 16 from undue movement radial to the mandrel when either of the balls is freed from locking engagement between the shaft and pulley, I provide for each ball a spring-loaded detent or plunger 60 slidably mounted in a longitudinal bore in shaft 5 parallel to bore 10, and being urged against the ball by a spring 61 seating at its other end against a threaded plug 62. Each of these plungers has a pointed end disposed to engage the ball at a point offset from its center so that it tends to yieldably retain the ball in either of its positions.

To lock pulley 20 to the shaft the mandrel is pushed to the left, permitting ball 16 to move out of engagement with pulley 22 and forcing ball 15 into engagement with pulley 20. The cam surfaces are so spaced in relation to the spacing of the balls axially of the drive shaft that in the course of effecting a speed change there is a momentary period during which neither of the pulleys is positively locked to the shaft, so that the ball being moved out of locking engagement with the pulley will tend to be forced inwardly of the opening 11 by virtue of the inertia of the free pulley and the spherical shape of the ball and recess. After the ball is moved inwardly of the opening, the plunger 60 will yieldably oppose radial movement of the ball.

This shifting or changing of speeds may be accomplished during rotation of the shaft 5 without undue stresses because the mandrel and balls move with the shaft and the appropriate ball member merely has to engage in the appropriate curved recess, which engagement is positively accomplished by the cam surfaces.

I claim:

A clutch for selectively locking one of a pair of recessed pulleys on a hollow shaft presenting longitudinally spaced radial openings underlying the respective pulleys, comprising a ball floatingly mounted in each opening, and means for selectively moving said balls into engagement with said respective recesses whereby selectively to lock the pulleys on the shaft, comprising a mandrel axially slidably mounted in the shaft bore, said mandrel having an annular groove whose opposite side walls provide oppositely disposed curved cam surfaces engageable with the respective balls in response to axial movement of the mandrel in said bore, and a pair of spring-loaded detent means normally engaging the respective balls in directions axially of the shaft, each of said members being slidably mounted in an auxiliary bore in the shaft parallel with the first-mentioned bore.

LESLIE PERHACS.

REFERENCES CITED

The following references are of record in the file of this patent:

UNITED STATES PATENTS

| Number | Name | Date |
| --- | --- | --- |
| 439,316 | White | Oct. 28, 1890 |
| 1,015,254 | Whisler | Jan. 16, 1912 |
| 1,895,821 | Rueckart et al. | Jan. 31, 1933 |
| 1,909,522 | Collins | May 16, 1933 |
| 2,034,767 | Neracher | Mar. 24, 1936 |
| 2,377,575 | Ringer | June 5, 1945 |